US012453923B2

(12) United States Patent
Samperi

(10) Patent No.: US 12,453,923 B2
(45) Date of Patent: Oct. 28, 2025

(54) GAME CONTROLLER WITH REPLACEABLE JOYSTICK GATE(S)

(71) Applicant: Panda Hardware LLC, Spring House, PA (US)

(72) Inventor: Matthew Samperi, Lansdale, PA (US)

(73) Assignee: Panda Hardware LLC, Spring House, PA (US)

( * ) Notice: Subject to any disclaimer, the term of this patent is extended or adjusted under 35 U.S.C. 154(b) by 180 days.

(21) Appl. No.: 17/978,428

(22) Filed: Nov. 1, 2022

(65) Prior Publication Data

US 2023/0133332 A1 May 4, 2023

Related U.S. Application Data

(60) Provisional application No. 63/274,743, filed on Nov. 2, 2021.

(51) Int. Cl.
*A63F 13/24* (2014.01)

(52) U.S. Cl.
CPC .................................... *A63F 13/24* (2014.09)

(58) Field of Classification Search
CPC ........... A63F 13/24; A63F 13/98; A63F 13/22
See application file for complete search history.

(56) References Cited

U.S. PATENT DOCUMENTS 5,607,158 A 3/1997 Chan
5,645,277 A 7/1997 Cheng
5,841,372 A 11/1998 Matsumoto
5,883,690 A 3/1999 Meyers et al.
6,279,906 B1 8/2001 Sanderson et al.
7,758,424 B2 7/2010 Riggs et al.
8,018,726 B2 9/2011 Friedlander et al.
8,241,126 B2 8/2012 Ambinder et al.
8,360,882 B2 1/2013 Liu
9,925,457 B2 3/2018 Gassoway et al.
10,124,249 B2 11/2018 Schmitz et al.
10,130,874 B2 11/2018 Schmitz et al.
10,427,037 B2 10/2019 Strahle et al.
10,441,881 B2 * 10/2019 Burgess .................. A63F 13/24
10,561,937 B2 2/2020 Strahle et al.

(Continued)

FOREIGN PATENT DOCUMENTS

WO 2007040499 A1 4/2007
WO 2020049340 A1 3/2020
WO 2020217374 A1 10/2020

OTHER PUBLICATIONS

Jonathan Sawyer, Astro's $200 Pro Game Controller is the Most Modular Yet, Dec. 31, 2019.
N/A, ThrustMaster Eswap X Pro Controller, The Modular, Wired Professional Controller For Xbox One/Series X|S and PC (Xbox Series X/), Dec. 11, 2020.

(Continued)

*Primary Examiner* — Peter J Iannuzzi
(74) *Attorney, Agent, or Firm* — James P. Muraff; McDonald Hopkins LLC

(57) ABSTRACT

A game controller that includes at least removable gate. Preferably, the game controller has at least one joystick and a gate associated with that joystick can be easily replaced, either with a gate having the same shaped opening or a gate having a different sized and/or shaped opening. The gate is connected to the game controller via any type of suitable attachment that provides for quick and easy removal of the gate, such as snaps, fasteners, magnetic attraction, etc., even an adhesive.

10 Claims, 2 Drawing Sheets

(56) References Cited

U.S. PATENT DOCUMENTS

| | | | | |
|---|---|---|---|---|
| 10,569,162 | B2 | 2/2020 | Strahle | |
| 10,722,787 | B2 | 7/2020 | Huffer et al. | |
| 10,780,343 | B2 | 9/2020 | Chou et al. | |
| 10,806,993 | B2 | 10/2020 | Goerz et al. | |
| 10,888,776 | B2 | 1/2021 | Palmer et al. | |
| 10,942,584 | B2 | 3/2021 | Strahle et al. | |
| 10,994,197 | B2 | 5/2021 | Schmitz | |
| 2009/0023501 | A1 | 1/2009 | Kidakarn | |
| 2009/0054146 | A1 | 2/2009 | Epstein et al. | |
| 2014/0323220 | A1 * | 10/2014 | Lee | A63F 13/00<br>463/37 |
| 2018/0185749 | A1 | 7/2018 | Kidakarn | |
| 2018/0207523 | A1 | 7/2018 | Lyden | |
| 2021/0113919 | A1 * | 4/2021 | Okamura | A63F 13/24 |

OTHER PUBLICATIONS

Author: Sha3Cat (Only known by alias) Title: Chat log Publication Date: Jan. 28, 2020 Publisher: Discord Published Location: https://discord.com/channels/291927795548815362/291927795548815362/671912099051470858 Please note that a free Discord account is required to view the corresponding information.
Required to view the corresponding information.
Extended European Search Report that issued in connection with corresponding European Patent Application No. 22205053.6 on Mar. 6, 2023.
European Patent Office, Extended European Search Report for Application 22205053.6, Mailed Mar. 6, 2023, 7 pgs., European Patent Office, Germany.

* cited by examiner

GAME CONTROLLER WITH REPLACEABLE JOYSTICK GATE(S)

RELATED APPLICATION (PRIORITY CLAIM)

The present application claims the benefit of U.S. Provisional Application Ser. No. 63/274,743, filed Nov. 2, 2021, which is hereby incorporated by reference in its entirety.

BACKGROUND

The present invention generally relates to game controllers, and more specifically relates to a game controller having at least one joystick and a removable gate that is associated with the joystick.

Game controllers often include one or more joysticks. A joystick gate is the physical part of the game controller shell that restricts a joystick's movement too far in certain directions and makes for more precise direction choices. In the industry, joystick gates have openings that come in many different shapes with the most common shaped opening being circle, octagon and square.

Sometimes, users will put notches in the gate of a game controller in order to make certain joystick inputs easier to hit. In addition to making certain joystick inputs easier to hit, notches also tend to provide tactile feedback for when the joystick is in specific input locations.

Joystick gates are physically part of the shell of the game controller. In other words, typically joystick gates are integral with the main body of the controller. As such, when a user cuts notches into a gate, the user risks damaging the game controller. Furthermore, a user could mistakenly cut a notch too deep into a gate, or cut the notch at slightly the wrong location, and then ultimately regret it. Mis-notching the gate of a game controller could cause the user to not want to use that particular game controller anymore or could cause the user to want to start over trying to notch a new game controller.

As discussed, joystick gates are physically part of the shell of the game controller. As such, other than notching a gate to make relatively minor adjustments to the shape of the gate, the overall shape of the gate cannot be readily and easily changed. For example, if a game controller includes a joystick that has a gate having a circular opening and the user would rather that the gate have an octagon opening, the user would have no choice but to attempt to notch into the existing circular gate in an attempt to convert it into an octagon. This presents the risk of damaging the game controller and/or mis-notching the gate.

Even if a user successfully notches a gate, those notches tend to get a lot of action and the notches tend to provide points of weakness in the shell of the game controller (which is typically plastic). As such, oftentimes those points tend to wear prematurely.

SUMMARY

One object of an embodiment of the present invention is to provide a game controller having at least one joystick and a removable gate that is associated with that joystick.

Another object of an embodiment of the present invention is to provide a game controller having at least one joystick gate that can be easily replaced, either with a gate having the same shaped opening or a gate having a different sized and/or shaped opening.

Still another object of an embodiment of the present invention is to provide a game controller having at least one joystick gate that can be easily swapped out for a gate having an opening that provides a different size or shape.

Briefly, an embodiment of the present invention provides a game controller which comprises at least one joystick. A gate is associated with the joystick (i.e., the gate surrounds, or is at least proximate to, the joystick). The gate is removable from the game controller. To that end, the gate is connected to the game controller via any type of suitable attachment that provides for quick and easy removal of the gate, such as magnetic attraction, snaps, fasteners, etc.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
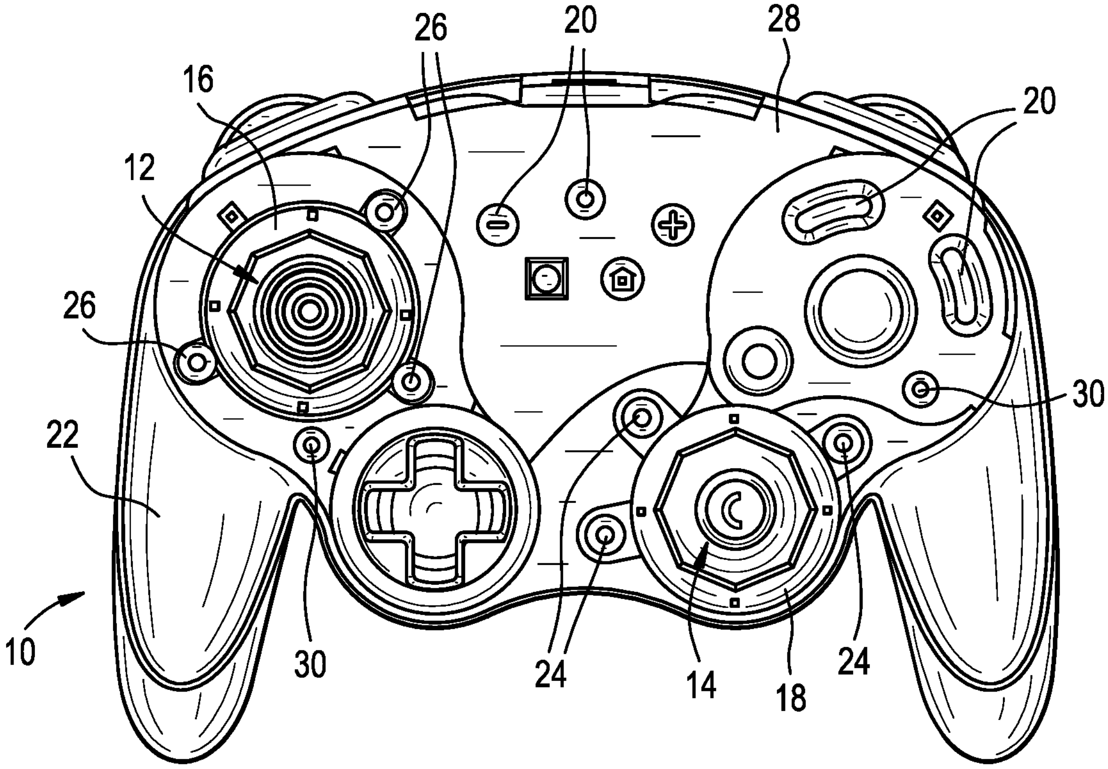
FIG. 1 provides a top view of a game controller that is in accordance with an embodiment of the present invention, wherein the game controller includes removable joystick gates.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

FIG. 1 provides a top view of a game controller 10 that is in accordance with an embodiment of the present invention. The game controller 10 includes at least one joystick 12, 14 and a removable gate 16, 18 associated with (surrounding or at least proximate to) the joystick 12, 14.

In the specific example shown in FIG. 1, the game controller 10 includes two joysticks 12 and 14, a removable gate 16 and 18 associated with each joystick 12 and 14, as well as other buttons and controls 20. The exact number and placement of joysticks, gates, buttons, controls, etc. is not imperative to the present invention and the game controller 10 shown in FIG. 1 is merely provided as one possible example. Furthermore, while gates 16, 18 having octagon shaped openings are shown, still other shapes and sizes of openings are, of course, totally possible.

As shown, the game controller 10 has a main shell body 22 and the gates 16, 18 (one gate 16 associated with the left joystick 12 and another gate 18 associated with the right joystick 14) are removably attached thereto.

Figure 2:
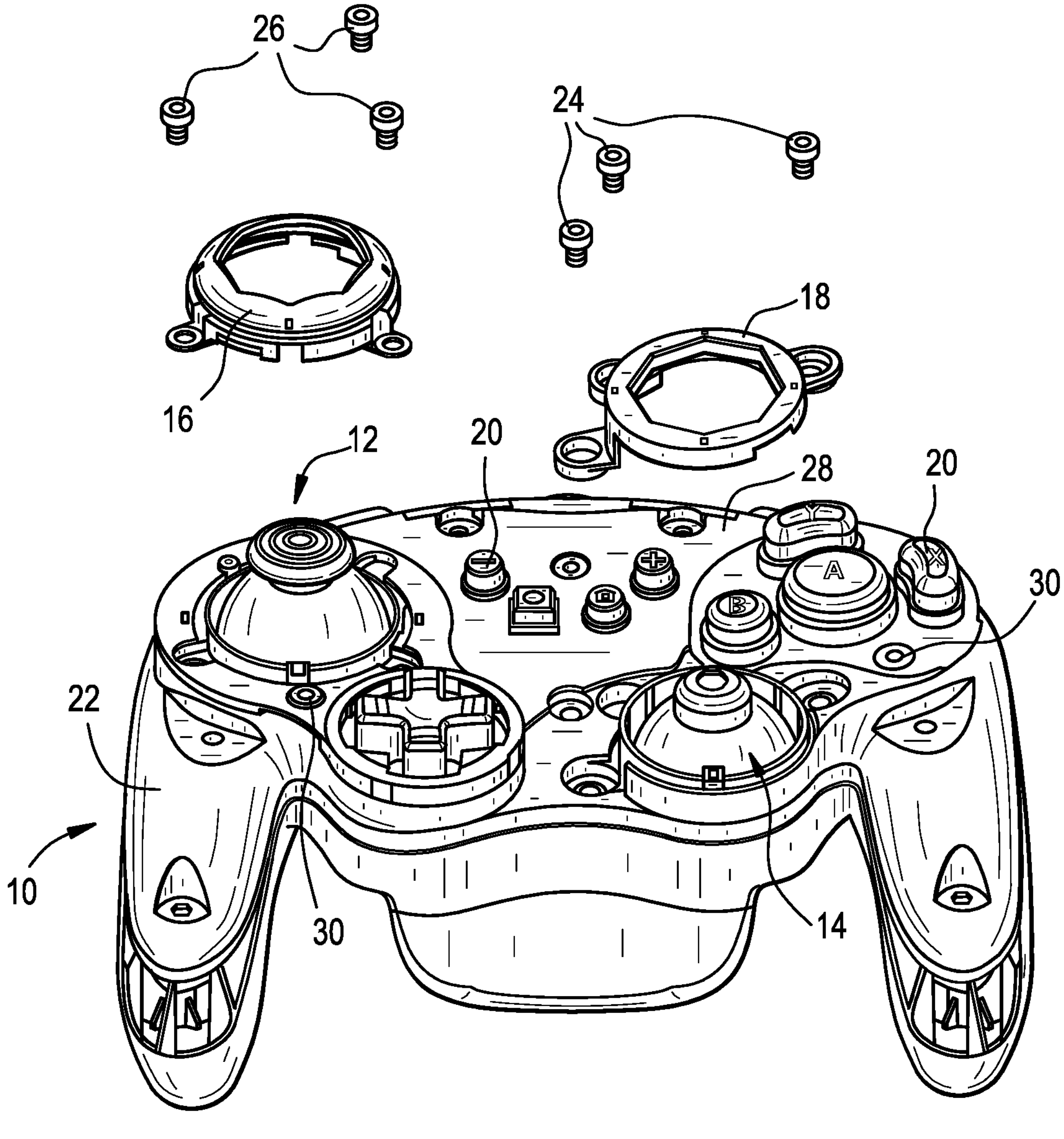
FIG. 2 is an exploded perspective view of the game controller showing the gates and the fasteners associated with those gates exploded away from the game controller.

FIG. 2 shows the gates 16, 18 and the fasteners 24, 26 associated with those gates 16, 18 removed from the game controller 10.

To replace the gate 16 of the left joystick 12, one merely removes the fasteners 26 associated with that gate 16, removes the gate 16, positions a new gate where the old gate used to be, and reinstalls the fasteners 26. The new gate would look just like the gate 16 shown in FIG. 1, but potentially could have a different shaped and/or sized opening. Likewise, to replace the gate 18 of the right joystick 14, one merely removes the fasteners 24 associated with that gate 18, removes the gate 18, positions a new gate where the old gate used to be, and reinstalls the fasteners 24. The new gate would look just like the gate 18 shown in FIG. 1, but potentially could have a different shaped and/or sized opening.

In the specific example shown in FIGS. 1 and 2, the game controller 10 also includes a cover piece 28 that surrounds the left joystick 12. While the cover piece 28 may be attached with fasteners 30, preferably the game controller 10 is configured such that neither the cover piece 28 nor the associated fasteners 30 have to be removed in order to replace either one of the gates 16 or 18.

FIGS. 1 and 2 show the specific example where the gates 16, 18 (and the cover piece 28) are attached to the game controller 10 with fasteners, but other methods of attachment could very well be used while still staying within the scope of the present invention. For example, one or more snaps can be used, magnets can be used, etc., even an adhesive can be used. Regardless, the gates 16, 18 are provided as separate pieces and therefore are removable.

Having a removable gate 16, 18 makes it possible for a user to replace a gate 16, 18 that has become worn or broken.

Furthermore, it makes it easier for a user to notch a gate 16 or 18 without risking messing up the entire shell 22, i.e., if the user makes a mistake when notching. Another gate could simply be purchased and installed on the game controller 10 to replace that was mis-notched.

Gates having different sized or shaped openings can be used as well. The stock gate 16, 18 being shown in FIG. 1 is a gate having an octagon shaped opening allowing for easy cardinal and diagonal inputs. However, gates having different openings, such as circular openings (or any other shape), can be used. This allows the user freedom to choose to what inputs each joystick 12, 14 of the game controller 10 is gated.

Alternatively, the gates 16, 18 shown in FIG. 1 having octagon shaped openings can be replaced with gates having smaller sized octagon openings.

Over time, when users notch a gate, the plastic of the notches wear down. Because the gate is a separate part, it can be made of a higher impact resistant material (compared to the rest of the game controller) to prevent breakdown over time.

These are just many of the advantages of providing removable or modular gates on a game controller.

While a specific embodiment of the invention has been shown and described, it is envisioned that those skilled in the art may devise various modifications without departing from the spirit and scope of the present invention.

What is claimed is:

1. A game controller comprising:

at least one joystick;

a removable gate associated with only one of said at least one joystick; wherein the removable gate completely surrounds only the at least one joystick, further comprising a main shell body, wherein the removable gate is removably attached to the main shell body, and a cover piece disposed between the main shell body and the removable gate, wherein removable gate can be removed from the main shell body without removing the cover piece.

2. A game controller as recited in claim 1, further comprising at least one fastener, wherein the at least one fastener is removable so that the removable gate can be removed from the game controller.

3. A game controller as recited in claim 1, further comprising at least one fastener, wherein the at least one fastener is removable so that the removable gate can be removed from the main shell body.

4. A game controller as recited in claim 1, wherein the cover piece is attached to the main shell body with a set of fasteners, wherein the set of fasteners need not be removed in order to remove the removable gate.

5. A game controller as recited in claim 1, further comprising a plurality of fasteners, wherein the plurality of fasteners are removable so that the removable gate can be removed from the game controller.

6. A game controller as recited in claim 1, wherein the at least one joystick comprises a plurality of joysticks, each of said plurality of joysticks having a removable gate associated therewith.

7. A game controller as recited in claim 1, wherein the removable gate has an octagon shaped opening, wherein the at least one joystick extends through the octagon shaped opening.

8. A game controller as recited in claim 1, further comprising a plurality of fasteners, wherein the plurality of fasteners are removable so that the removable gate can be removed from themain shell body and replaced with another removable gate.

9. A game controller as recited in claim 1, further comprising at least one fastener, wherein the at least one fastener is removable so that the removable gate can be removed from the game controller and replaced with another removable gate.

10. A game controller as recited in claim 1, wherein the cover piece is attached to the main shell body with a set of fasteners, wherein the set of fasteners need not be removed in order to remove the removable gate.

* * * * *